(12) United States Patent
Sellers

(10) Patent No.: US 11,038,920 B1
(45) Date of Patent: Jun. 15, 2021

(54) BEHAVIOR MANAGEMENT OF DECEPTION SYSTEM FLEETS

(71) Applicant: Rapid7, Inc., Boston, MA (US)

(72) Inventor: Thomas Eugene Sellers, Georgetown, TX (US)

(73) Assignee: Rapid7, Inc., Boston, MA (US)

( * ) Notice: Subject to any disclaimer, the term of this patent is extended or adjusted under 35 U.S.C. 154(b) by 118 days.

(21) Appl. No.: 16/367,897

(22) Filed: Mar. 28, 2019

Related U.S. Application Data

(63) Continuation-in-part of application No. 16/367,502, filed on Mar. 28, 2019.

(51) Int. Cl.
*H04L 29/06* (2006.01)

(52) U.S. Cl.
CPC ...... *H04L 63/1491* (2013.01); *H04L 63/1416* (2013.01); *H04L 63/1433* (2013.01)

(58) Field of Classification Search
CPC .............. H04L 63/1491; H04L 63/1416; H04L 63/1433
See application file for complete search history.

(56) References Cited

U.S. PATENT DOCUMENTS

| | | | | |
|---|---|---|---|---|
| 8,156,541 B1* | 4/2012 | Thomas | ............... | H04L 63/1491 726/3 |
| 8,156,556 B2* | 4/2012 | Krishnamurthy | ... | H04L 63/1441 726/23 |
| 8,443,439 B2* | 5/2013 | Lamastra | ............ | H04L 63/0227 726/22 |
| 8,584,239 B2* | 11/2013 | Aziz | ........................ | H04L 63/14 726/24 |
| 9,602,536 B1* | 3/2017 | Brown, Jr. | .......... | H04L 63/1491 |
| 9,860,208 B1* | 1/2018 | Ettema | .................. | G06F 21/552 |
| 10,110,629 B1* | 10/2018 | Kruse | .................. | H04L 63/0236 |
| 10,270,798 B2* | 4/2019 | Zaffarano | ............... | H04L 63/20 |
| 10,277,629 B1* | 4/2019 | Guntur | ............... | H04L 63/1433 |
| 10,395,031 B2* | 8/2019 | Shyamsunder | ..... | H04L 63/1491 |
| 2004/0078592 A1* | 4/2004 | Fagone | ............... | H04L 63/0272 726/22 |
| 2005/0166072 A1* | 7/2005 | Converse | ............ | H04W 12/122 726/5 |
| 2012/0084866 A1* | 4/2012 | Stolfo | ................. | H04L 63/1416 726/25 |

(Continued)

OTHER PUBLICATIONS

David Dagon, et al., (HoneyStat: Local Worm Detection Using Honeypots, Jul. 21, 2013, Retrieved from https://web.archive.org/web/20130701000000*/http://wenke.gtisc.gatech.edu/papers/honeystat.pdf, hereinafter Dagon).*

(Continued)

*Primary Examiner* — Ponnoreay Pich
(74) *Attorney, Agent, or Firm* — Ashwin Anand

(57) ABSTRACT

Disclosed herein are methods, systems, and processes for managing and controlling the collective behavior of deception computing system fleets. A malicious attack initiated by a malicious attacker received by a honeypot that is part of a network along with other honeypots is detected. Information associated with the malicious attack is received from the honeypot. Based on the received information, a subset of honeypots other than the honeypot are configured to entice the attacker to engage with the subset of honeypots or avoid the subset of honeypots.

19 Claims, 11 Drawing Sheets

(56) References Cited

U.S. PATENT DOCUMENTS

| | | | | |
|---|---|---|---|---|
| 2013/0242743 | A1* | 9/2013 | Thomas | H04L 45/306 |
| | | | | 370/236 |
| 2015/0128246 | A1* | 5/2015 | Feghali | H04L 63/0209 |
| | | | | 726/13 |
| 2017/0310704 | A1* | 10/2017 | Wu | H04L 63/1433 |
| 2017/0329783 | A1* | 11/2017 | Singh | G06F 16/24578 |
| 2017/0353491 | A1* | 12/2017 | Gukal | H04L 63/1408 |
| 2017/0353492 | A1* | 12/2017 | Wick | H04L 63/1441 |
| 2018/0302438 | A1* | 10/2018 | Robertson | H04L 63/1491 |
| 2019/0230124 | A1* | 7/2019 | Hodgman | H04L 67/12 |
| 2020/0160116 | A1* | 5/2020 | Fedorova | G06N 20/00 |

OTHER PUBLICATIONS

Iyatiti Mokube, et al., Honeypots: concepts, approaches, and challenges, ACM-SE 45: Proceedings of the 45th annual southeast regional conference, Mar. 2007, pp. 321-326.*

* cited by examiner

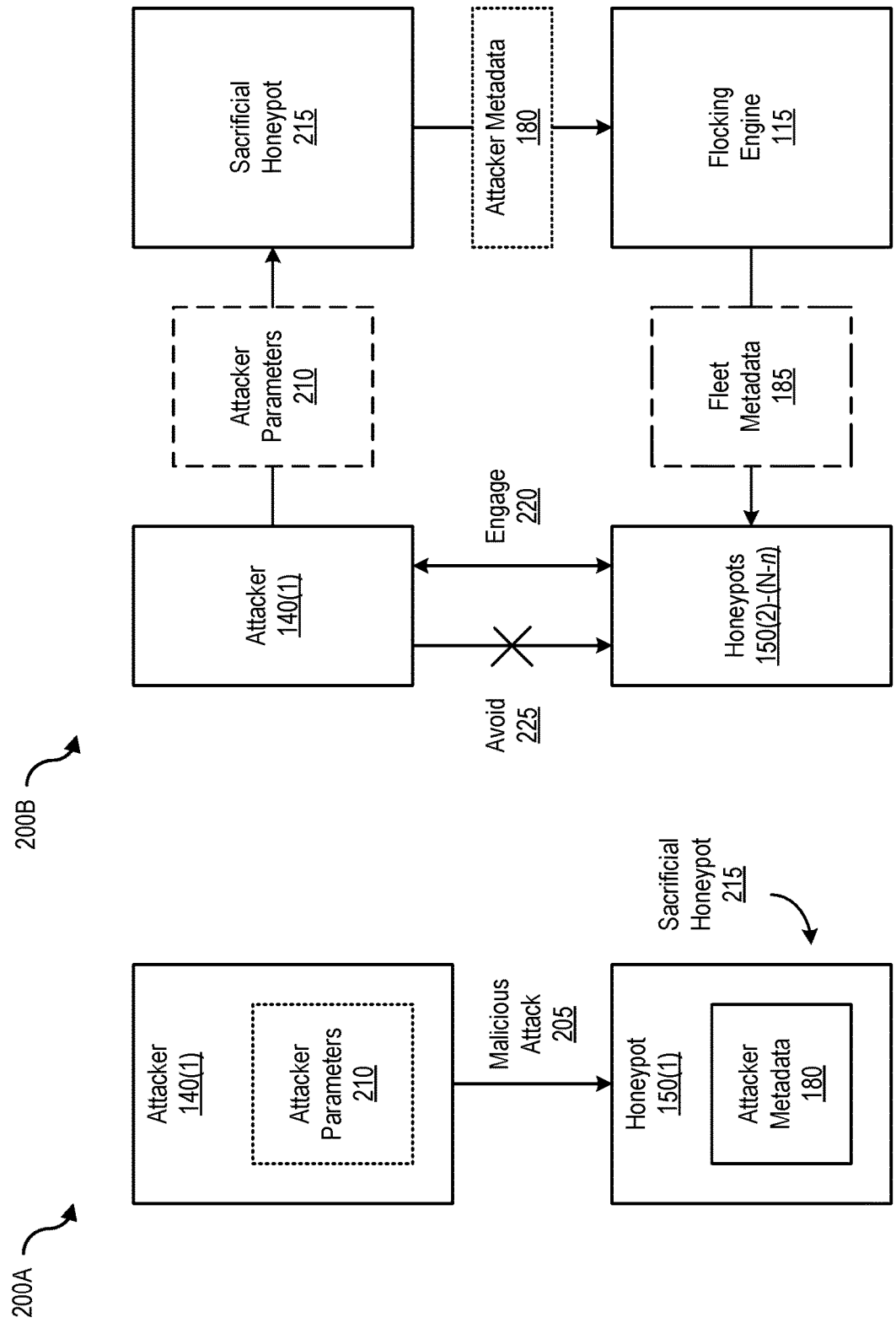

FIG. 3

| Network Field 310 | Attacker Field 315 | Source IP Address Field 320 | Behavior Field 325 | Attacker Metadata Field 330 | Fleet Metadata Field 335 | Fleet Field 340 |
|---|---|---|---|---|---|---|
| 160(1) | 140(1) | 69.89.31.226 | Engage | EternalBlue; Windows; SMB;... | OS 345(1), Service 350(1), Banner 355(1), Host Name 360(1) | Honeypots 150(2)-(10) |
| | 140(2) | 172.16.254.1 | Avoid or Block | Apache Struts; Java, Linux,... | OS 345(2), Service 350(2), Banner 355(2), Host Name 360(2) | Honeypots 150(11)-(15) |
| 160(2) | 140(3) | 216.58.216.164 | Engage | Winbox CVE-2018-14847 RCE; MikroTik RouterOS;... | OS 345(3), Service 350(3), Banner 355(3), Host Name 360(3) | Honeypots 150(16)-(25) |
| 160(3) | 140(4) | 34.126.35.125 | Mixed | JBoss jxm-console; JBoss Application Server,... | OSs 345(4)-(5), Services 350(4)-(5), Banners 355(4)-(5), Host Names 360(4)-(5) | A4 Honeypots 150(30)-(75) E5 Honeypots 150(80)-(95) |
| ... | ... | ... | ... | ... | ... | ... |

Fleet State Table 305

BEHAVIOR MANAGEMENT OF DECEPTION SYSTEM FLEETS

CROSS-REFERENCE TO RELATED APPLICATIONS

The present application claims the benefit (and is a Continuation-In-Part (CIP)) of U.S. Utility patent application Ser. No. 16/367,502 titled "Multiple Personality Deception Systems" and filed on Mar. 28, 2019, the disclosure of which is incorporated by reference as if set forth in its entirety herein.

BACKGROUND

Field of the Disclosure

This disclosure is related to deception systems implemented in cybersecurity computing environments. In particular, this disclosure is related to managing and/or controlling the collective behavior of a fleet of honeypots.

Description of the Related Art

Honeypots are physical or virtual computing systems implemented in a network as a decoy to lure malicious actors (e.g., hackers) in an attempt to detect, deflect, and/or study hacking attempts. Such deception systems can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

Although honeypots can share information they gather individually when implemented in networked cybersecurity computing environments (e.g., state information, plain text credentials, and the like), existing mechanisms of honeypot deployment and management do not permit behavioral changes to be made to a fleet of honeypots and are not dynamically adaptive when it comes to measuring and bolstering attacker engagement (e.g., to become more attractive to a given malicious attacker).

Unfortunately, under existing honeypot deployment and management paradigms, attack telemetry data (e.g., attack intelligence) gathered by an initial honeypot is not optimally utilized and/or exploited for defensive and attack research purposes in a dynamic and real time manner at the fleet level. Therefore, it is desirable to manage and/or control the collective behavior of honeypot fleets to facilitate operator goals in cybersecurity computing environments.

SUMMARY OF THE DISCLOSURE

Disclosed herein are methods, systems, and processes for managing and/or controlling the collective behavior of a fleet of honeypots. One such method involves detecting a malicious attack initiated by an attacker that is received by a honeypot that is part of a network along with other honeypots, receiving information associated with the malicious attack from the honeypot, and based on the received information, configuring a subset of honeypots other than the honeypot to entice the attacker to engage with the subset of honeypots or avoid the subset of honeypots.

In some embodiments, the method involves configuring a first subset of honeypots other than the honeypot to entice the attacker to continue engagement and/or interaction with the first subset of honeypots and configuring a second subset of honeypots other than the honeypot to deter the attacker from engaging and/or interacting with the second subset of honeypots. Configuring the first subset of honeypots involves provisioning the first subset of honeypots substantially similarly to the honeypot and configuring the second subset of honeypots comprises provisioning the second subset of honeypots substantially differently to the honeypot.

In certain embodiments, the method involves one or more of accessing a fleet state table, modifying the fleet state table, performing a scaled flocking operation, configuring the first subset of honeypots to be vulnerable to the malicious attack directed at the honeypot, and/or configuring the subset of honeypots based on criteria including an attacker location, a vulnerability age, or an unknown vulnerability.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 2A is a block diagram 200A of a sacrificial honeypot, according to one embodiment of the present disclosure.

FIG. 2B is a block diagram 200B of a sacrificial honeypot interacting with a flocking engine, according to one embodiment of the present disclosure.

FIG. 3 is a table 300 that illustrates a fleet state table, according to one embodiment of the present disclosure.

Figure 1A:
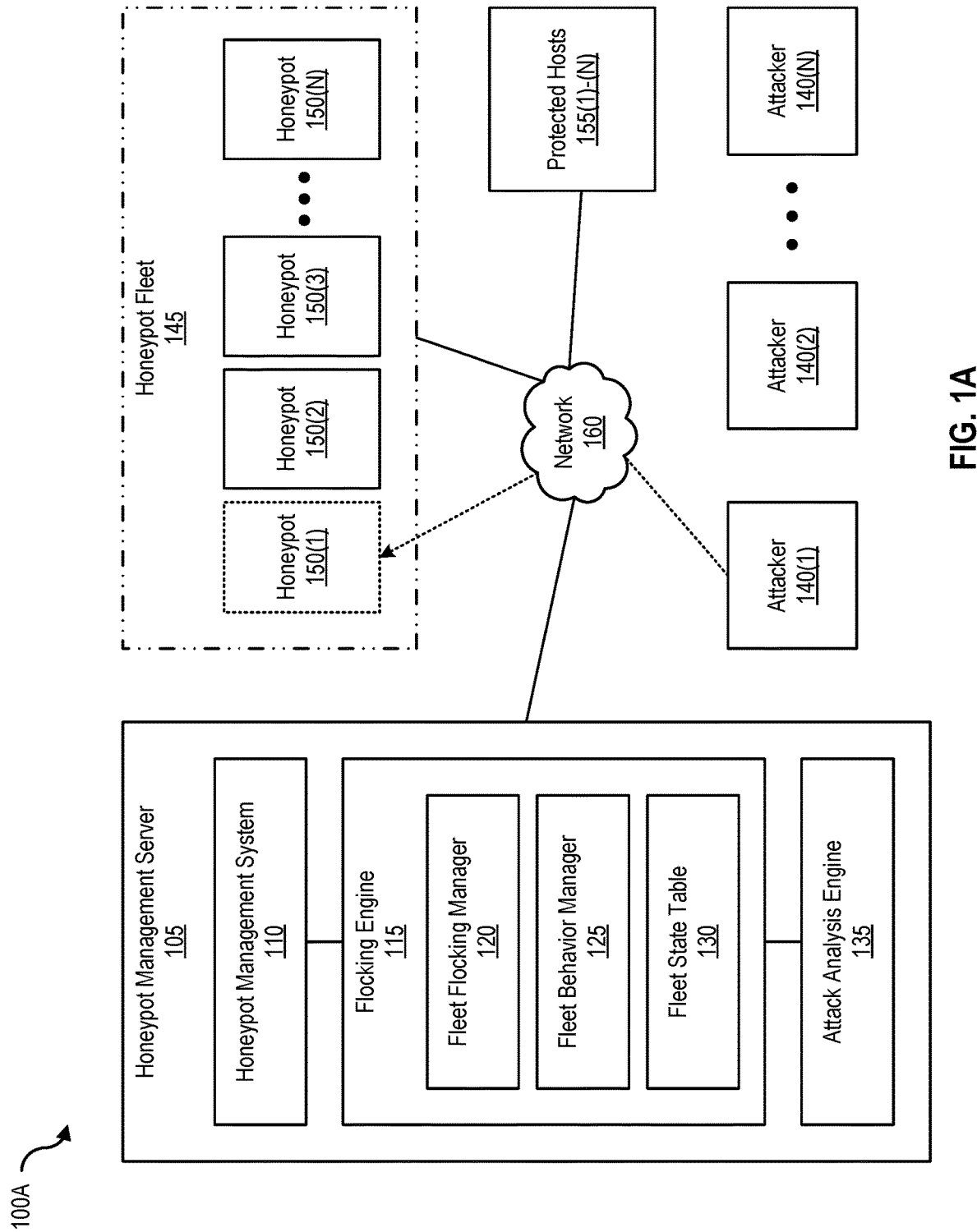
FIG. 1A is a block diagram 100A of a honeypot management server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Honeypots are valuable computing devices to collect intelligence and telemetry data associated with a malicious attack. Because a malicious attacker interacts with a honeypot under the impression that they are interacting with a real protected host (e.g., a production system), attack intelligence can be gathered, processed, and analyzed to make cybersecurity computing environments safer by protecting them from persistent threat actors. Therefore, honeypots can be used deceive malicious attackers into giving up their playbook, so to speak.

In cybersecurity computing environments that implement honeypots, opposing parties have widely conflicting goals. Malicious attackers desire gaining access to a real protected host that is supposedly protected by a honeypot or decloaking a honeypot as a deception system. On the other hand, information technology (IT) and cybersecurity professionals want to maximize attacker engagement and interaction with a honeypot. Of particular desirability from the defensive standpoint is tracking the horizontal movement of a malicious attacker in a network.

As noted, current paradigms for honeypot deployment enable information sharing between honeypots. Such information can include state information, credentials, and the like. Unfortunately, optimally utilizing and/or exploiting attack telemetry data and attack intelligence gathered by an initially attacked honeypot to dynamically control honeypot behavior presents a technological challenge because existing systems do not permit behavioral changes to be made to honeypot fleets (e.g., based on an ongoing malicious attack).

Therefore, it can be beneficial to manage honeypots in a manner that facilitates a change in behavior in whole or in part of a honeypot fleet based on malicious attacks or other network stimulus in order to achieve operational goals such as attacker interaction or honeypot accessibility. For example, honeypots can be configured at the fleet level to become more enticing to an attacker with the goal of gathering more information or keeping the attacker engaged until a response can be initiated. In addition, honeypots other than the initial target(s) can be configured at the fleet level to become less enticing to the attacker and block the source Internet Protocol (IP) address of the attacker to reduce the likelihood of the attacker interacting with honeypots and decloaking them as honeypots.

Example Honeypot Management Server for Fleet Flocking Operations

FIG. 1A is a block diagram 100A of a honeypot management server 105 that performs fleet flocking, according to one embodiment. Honeypot management server 105 can be any type of physical or virtual computing device and includes at least a honeypot management system 110, a flocking engine 115 with a fleet flocking manager 120, a fleet behavior manager 125, and a fleet state table 130, and an attack analysis engine 135. Honeypot management server 105 is communicatively coupled to a honeypot fleet 145 with honeypots 150(1)-(N) via network 160, which can be any type of network or interconnection. Also part of network 160 are protected hosts 155(1)-(N), which can be any type of physical or virtual computing devices. In some embodiments, one or more attackers 140(1)-(N) initiate one or more malicious attacks directed at one or more protected hosts 155(1)-(N) via network 160.

In one embodiment, flocking engine 115 permits honeypots 150(2)-(N) or one or more subsets of honeypots thereof to dynamically adapt their personalities to become more or less interesting or enticing to an attacker or to block the attacker outright with the added technical benefit of meeting operational goals that can include delaying the attacker, gathering (attack) intelligence, or hiding one or more honeypots or one or more subsets of honeypots from the attacker. By performing honeypot flocking at the fleet level (e.g., referred to hereinafter as a fleet flocking operation), the attack intelligence and attack telemetry data gathered from one honeypot (e.g., an initial sacrificial honeypot) can inform the behavior of other honeypots before the attacker has (had) a chance to interact with the other honeypots. Therefore, the honeypot fleet flocking system of FIG. 1A permits honeypot fleet wide coordinated behavioral change in response to stimuli to achieve operational goals such as attacker interaction or honeypot accessibility in cybersecurity computing environments.

In certain embodiments, honeypots 150(1)-(N) are each capable of implementing multiple network, operating system (OS), and/or service personalities and can include a dynamically configurable firewall, and honeypot management system 110 provides for centralized configuration, deployment, management, and operation of the honeypot ecosystem (e.g., honeypot fleet 145). For example, a personality state table (PST) can be maintained centrally by honeypot management server 105 or by individual honeypots for state tracking purposes.

Figure 1C:
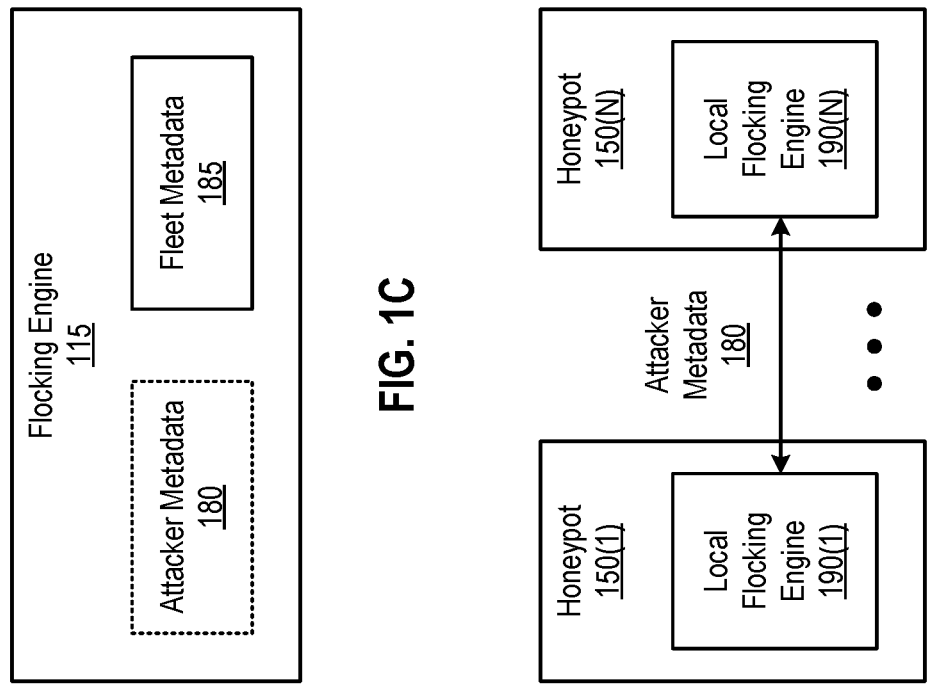
FIG. 1C is a block diagram 100C of a flocking engine, according to one embodiment of the present disclosure.
Figure 1D:
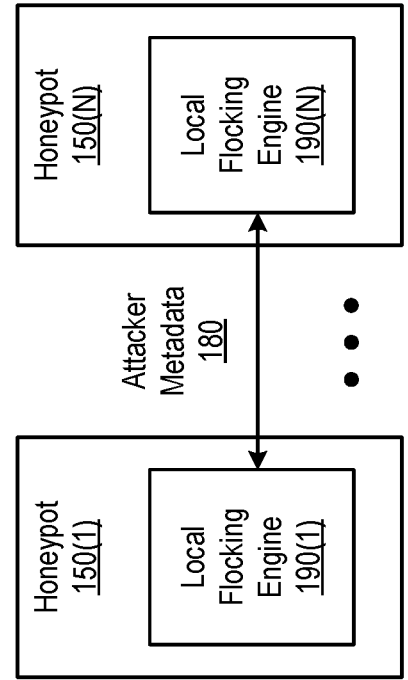
FIG. 1D is a block diagram of honeypots sharing attacker metadata, according to one embodiment of the present disclosure.
Figure 1B:
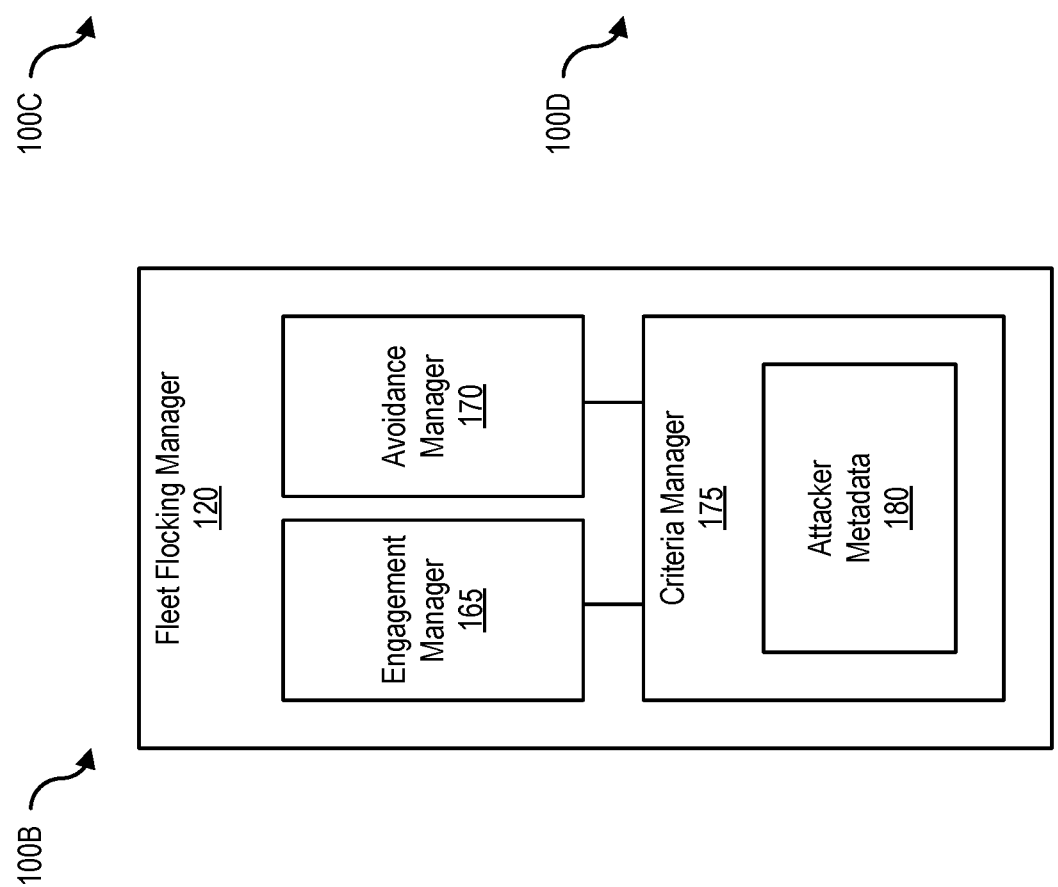
FIG. 1B is a block diagram 100B of a fleet flocking manager, according to one embodiment of the present disclosure.

FIG. 1B is a block diagram 100B of fleet flocking manager 120, according to one embodiment. Fleet flocking manager 120 includes at least an engagement manager 165, an avoidance manager 170, and a criteria manager 175 that maintains attacker metadata 180. Fleet flocking manager tracks one or more desired fleet flocking behaviors using engagement manager 165, avoidance manager 170, or criteria manager 175, which includes a combination of engagement and avoidance.

In one embodiment, engagement manager 165 changes the behavior and/or the personality of one or more of honeypots 150(2)-(N) or one or more subsets of honeypots 150(2)-(N) of honeypot fleet 145 to match the behavior and/or personality of a target honeypot that, based on attacker behavior, might entice an attacker to interact (e.g., the initial (sacrificial) honeypot that is the purported "victim" of a malicious attack by an attacker —shown as honeypot 150(1) and attacker 140(1), respectively, in FIG. 1A).

In another embodiment, avoidance manager 170 changes the behavior and/or the personality of one or more of honeypots 150(2)-(N) or one or more subsets of honeypots 150(2)-(N) of honeypot fleet 145 to differ from the behavior and/or personality of a target honeypot that, based on attacker behavior, might dissuade an attacker from interacting. In this example, avoidance manager 170 can also outright block network and data traffic from the attacker.

In certain embodiments, criteria manager 175 uses attacker metadata 180 to perform a mix (or combination) of engagement and avoidance. For example, criteria manager 175 can avoid external attackers but can engage internal attackers, or can engage an attacker leveraging an unknown or recently published vulnerability. Attacker metadata 180 includes, but is not limited to, an IP address (or a range of IP addresses) from which a given malicious attack is initiated, one or more vulnerabilities targeted by the attack, one or more exploits used to target the one or more vulnerabilities, operating systems and network and/or storage protocols and devices implicated by the exploits used, information sought by the attack, systems targeted by the attack, services executing on the targeted systems, the length of duration of the attack, indications whether the attackers seeks to move/traverse horizontally or vertically, and the like. It should be noted that fleet flocking manager 120 can be maintained by one or more of honeypots 150(1)-(N) in a distributed manner, or by honeypot management server 105 in a centralized manner.

FIG. 1C is a block diagram 100C of a flocking engine, according to one embodiment. In addition to implementing fleet flocking manager 120, fleet behavior manager 125, and fleet state table 130, flocking engine 115 also manages attacker metadata 180 (discussed with respect to FIG. 1B) and fleet metadata 185. Flocking engine 115 causes behavioral changes in a fleet of honeypots or in one or more subsets of a honeypot fleet (e.g., engagement, avoidance, or a combination) based on fleet flocking instructions received from fleet behavior manager 125. Fleet metadata 185 includes configuration information about honeypots in honeypot fleet 145. For example, fleet metadata 185 can include the personality profile of a honeypot—e.g., a network personality, an OS personality, and/or a service personality, as well as how such network, OS, and service personalities are specifically configured (e.g., their associated network shares, storage devices, banners, protocols, and the like).

FIG. 1D is a block diagram of honeypots sharing attacker metadata, according to one embodiment. In this example, honeypot 150(1) includes a local flocking engine 190(1) and honeypot 150(N) includes a local flocking engine 190(N). Honeypots 150(1) and 150(N) share attacker metadata 180, which can be supplemented by fleet metadata of a given honeypot (e.g., local fleet metadata maintained by local flocking engine 190(1)) to perform distributed fleet flocking operations. Therefore, in certain embodiments, individual honeypots can perform fleet flocking operations without the involvement of honeypot management server 105.

In some embodiments, fleet flocking manager 120 implemented by flocking engine 115 tracks which behaviors to assign to which honeypots in the fleet (e.g., honeypot fleet 145). These behaviors can be mixed and matched based on operational needs. For example, fleet flocking manager 120 can determine that engagement is more appropriate in server subnets while avoidance is the better option for honeypots among workstations. In other examples, and as noted, fleet flocking manager 120 can perform a combination of engagement and avoidance.

In other embodiments, attack analysis engine 135 analyzes attacks against a honeypot (e.g., a malicious attack by attacker 140(1) against honeypot 150(1) as shown in FIG. 1A), determines the most likely OS, service, and/or vulnerability the attacker is/was attempting to exploit, and communicates/transmits this information to flocking engine 115 as attacker metadata 180 (which can be contextualized by flocking engine 115 using fleet metadata 185).

Examples of Performing Honeypot Fleet Flocking Operations

FIGS. 2A and 2B are block diagrams 200A and 200B of a sacrificial honeypot 215, according to some embodiments. Attacker 140(1) initiates a malicious attack 205 against honeypot 150(1). Attacker parameters 210 (e.g., an exploit used to target a vulnerability, and the like) are transmitted to honeypot 150(1) by attacker 140(1) as part of malicious attack 205 which stores attacker parameters 210 as attacker metadata 180 (e.g., for contextualization or harmonization with fleet metadata 185). In this example, honeypot 150(1) is a sacrificial honeypot 215 (e.g., a honeypot that is the first honeypot in a honeypot fleet that is attacked or that is permitted to be attacked and thus cannot be part of a fleet flocking operation).

In one embodiment, attack analysis engine 135 detects malicious attack 205 initiated by attacker 140(1) that is received by honeypot 150(1), which in this case, is sacrificial honeypot 215. Flocking engine 115 receives information associated with malicious attack 205 from sacrificial honeypot 215 (e.g., attacker metadata 180 as shown in FIG. 2B), and based on the received information, configures, using fleet metadata 185, a subset of honeypots other than the sacrificial honeypot to entice attacker 140(1) to engage (e.g., engage 220) with the subset of honeypots or avoid (e.g., avoid 225) the subset of honeypots (e.g., honeypots 150(2)-(N-n) as shown in FIG. 2B).

In some embodiments, enticing attacker 140(1) involves mirroring or copying the configuration profile or personality of sacrificial honeypot 215. In this example, flocking engine 115 transmits instructions to the subset of honeypots to mirror the profile or personality of the honeypot that is under attack (e.g., sacrificial honeypot 215). In one embodiment, the profile or personality mirroring or copying during an ongoing malicious attack is based, at least in part, on attacker parameters 210 and fleet metadata 185. For example, if attacker 140(1) is using the EternalBlue exploit, flocking engine 115 can determine which honeypots of honeypots 150(2)-(N-n) are honeypots that are or can be configured as Windows computing systems. The subset of honeypots subject to engagement can then be adjusted (up or down) based on the correlation or harmonization between attack parameters 210 and fleet metadata 185. Similarly, if attacker 140(1) is seeking to access a confidential employee database, a subset of honeypots can be configured to mimic an e-commerce database, thus enticing attacker 140(1) to avoid those honeypots.

Figure 2C:
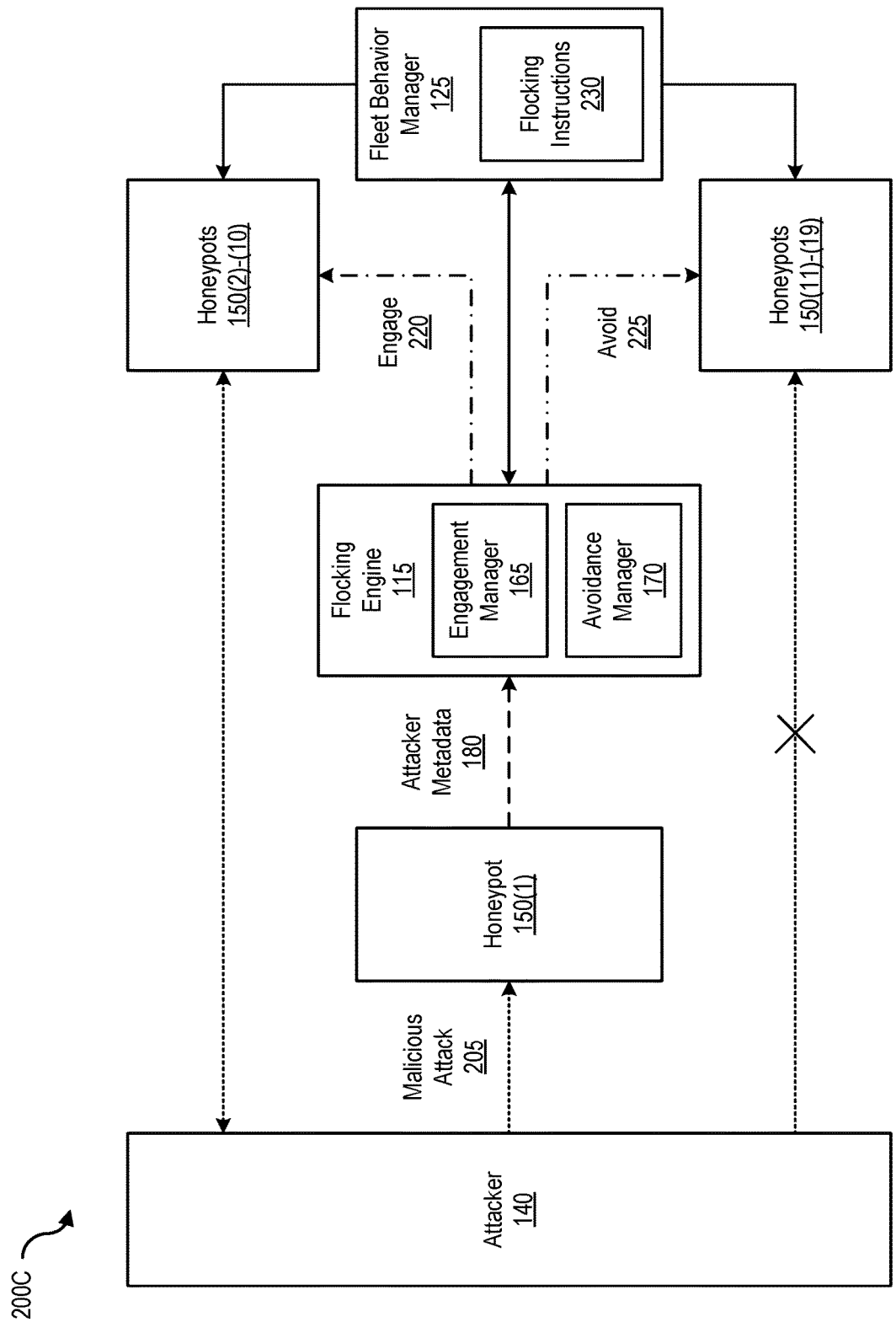
FIG. 2C is a block diagram 200C of a fleet flocking operation, according to one embodiment of the present disclosure.

FIG. 2C is a block diagram 200C of a fleet flocking operation, according to one embodiment. As shown in FIG. 2C, fleet behavior manager 125 transmits flocking instructions 230 to flocking engine 115 that enables the configuration of a first subset of honeypots other than honeypot 150(1) (e.g., honeypots 150(2)-(10)) to entice attacker 140 to continue engagement and/or interaction with the first subset of honeypots. Similarly, fleet behavior manager 125 transmits flocking instructions 230 to flocking engine 115 that enables the configuration of a second subset of honeypots other than honeypot 150(1) (e.g., honeypots 150(11)-(19)) to deter attacker 140 from engaging and/or interacting with the second subset of honeypots.

In certain embodiments, configuring the first subset of honeypots involves provisioning the first subset of honeypots substantially similarly to honeypot 150(1) and configuring the second subset of honeypots involves provisioning the second subset of honeypots substantially differently than honeypot 150(1). In these examples, criteria for configuring the subset of honeypots that are subject to a scaled flocking operation (e.g., multiple honeypots rapidly changing behavior based on flocking instructions 230 to trigger engagement or avoidance) can include, but is not limited to, an attacker location, a vulnerability age, or an unknown vulnerability.

A scaled flocking operation permits a group of honeypots to adapt a particular behavior, profile, or personality—as a group, to respond to an attacker and/or an ongoing malicious attack. The behavioral changes are responses to how a particular attacker is engaged with the initial (sacrificial) honeypot. Because the scaled flocking operation involves multiple honeypots, a honeypot ecosystem can be made more attractive or less attractive in the aggregate to a malicious attacker. This type of fleet behavior management entices a malicious attacker to go further and exposes more attack telemetry data and attack intelligence for gathering and analysis.

On the other hand, if the goal is to prevent a particularly sophisticated attacker from determining that there are multiple honeypots operating in a cybersecurity computing environment, one or more groups of honeypots can be configured for avoidance (e.g., by being configured substantially differently than the honeypot that is currently under attack), thus reducing the risk that (the other) honeypots will be de-cloaked by the attacker. Therefore, attacker behavior captured at one honeypot (e.g., honeypot 150(1)) can be shared between honeypots to influence fleet behavior (e.g., in real time and on the fly) based on operational goals.

It will be appreciated that because decisions regarding scaled flocking operations are made centrally (e.g., by honeypot management server 105), operational and configuration-based autonomy is maintained at the honeypot level. In one embodiment, honeypot management server 105 merges attacker data collected over a period of time or over a certain number of attacks. In this manner, instructions for scaled flocking operations can be generated earlier in the attack process (e.g., soon after a malicious attack is initiated, if initiated from a source IP address or a range of source IP addresses that are part of the merged attacker data).

Therefore, scaled flocking permits the proportioning of a honeypot fleet based on attacker behavior because flocking instructions are generated by contextualizing or harmonizing attacker characteristics and fleet metadata. For example, 50% of honeypots in a honeypot fleet can be configured to entice attacker engagement based on contextualization or harmonization between attacker metadata 180 and fleet metadata 185 indicating that a given (or standard) profile or personality is required for the 50% of honeypots in the honeypot fleet (e.g., Windows systems that are made particularly vulnerable to a certain exploit that the attacker is already using). Similarly, the remaining 50% of honeypots in the honeypot fleet can be configured to avoid attacker engagement based on based on contextualization or harmonization between attacker metadata 180 and fleet metadata 185 indicating that a customized profile or personality is required for the remaining 50% of honeypots in the honeypot fleet (e.g., Unix systems that are not vulnerable to a certain exploit that the attacker is already using).

Example Fleet State Table

FIG. 3 is a table 300 that illustrates a fleet state table 305, according to one embodiment. Fleet state table 305 includes at least a network field 310, an attacker field 315, a source IP address field 320, a behavior field 325, an attacker metadata field 330, a fleet metadata field 335, and a fleet field 340. As shown in FIG. 1A, fleet state table 305 can be maintained by honeypot management server 105 as fleet state table 130 or can be maintained by individual honeypots of honeypot fleet 145. Honeypots in honeypot fleet 145 can also share (an updated) fleet state table 305 based on merged attacker data, new attack characteristics that are part of a new malicious attack or new malicious attacker, a new (or unknown) vulnerability, and the like. Fleet state table 305 can be used to perform scaled flocking operations on proportioned honeypot fleets.

In one embodiment, a network 160(1) experiences a simultaneous malicious attack from attackers 140(1) and 140(2) with source IP addresses 69.89.31.226 and 172.16.254.1, respectively. An analysis of the respective malicious attacks by attack analysis engine 135 indicates that attacker 140(1) is using the EternalBlue exploit that affects Windows systems (e.g., via exploitation of a vulnerability in the Server Message Block (SMB) protocol) and attacker 140(1) is using the Apache Struts exploit, which affects Java and Linux-based systems. Therefore, based on operational goals (which in this case require engagement with an attacker using EternalBlue), flocking engine 115 configures honeypots 150(2)-(10) with OS 345(1), service 350(1), banner 355(1), and host name 360(1) to entice attacker 140(1) to engage with honeypots 150(2)-(10) after attacker 140(1) is finished interacting with honeypot 150(1). Similarly, flocking engine 115 configures honeypots 150 (11)-(15) with OS 345(2), service 350(2), banner 355(2), and host name 360(2) to deter attacker 140(2) from engaging with honeypots 150(11)-(15) after attacker 140(2) is finished interacting with honeypot 150(1). Therefore, honeypot management server 105 can proportion a honeypot fleet to enable disparate subgroups of the honeypot fleet to behave in differing manners based on operation goals that can accommodate a simultaneous malicious attack from two (or more) different malicious attackers.

In another embodiment, a network 160(2) receives a malicious attack from attacker 140(3) with source IP address 216.58.216.164. Attack analysis engine 135 indicates that attacker 140(3) is using the Winbox CVE-2018-14847 RCE exploit which affects MikroTik RouterOS. Therefore, flocking engine 115 configures honeypots 150(16)-(25) with OS 345(3), service 350(3), banner 355(3), and host name 360(3) to entice attacker 140(3) to engage with honeypots 150(16)-(25) (e.g., if and when attacker 140(3) wants to move on from the initial sacrificial honeypot).

In certain embodiments, flocking engine 115 can perform a mixed scaled flocking operation. A single malicious attack from attacker 140(4) received from source IP address 34.126.35.125 that uses the JBoss jxm-console exploit that affects JBoss Application Server can cause flocking engine 115 to configure honeypots 150(30)-(75) for engagement with OS 345(4), service 350(4), banner 355(4), and host name 360(4), and honeypots 150(80)-(95) for avoidance with OS 345(5), service 350(5), banner 355(5), and host name 360(5). A honeypot fleet can be proportioned to enable disparate scaled flocking operations to be performed on disparate subgroups of honeypots to facilitate engagement or avoidance of a single malicious attacker.

Example Processes to Manage the Behavior of Deception System Fleets

Figure 4:
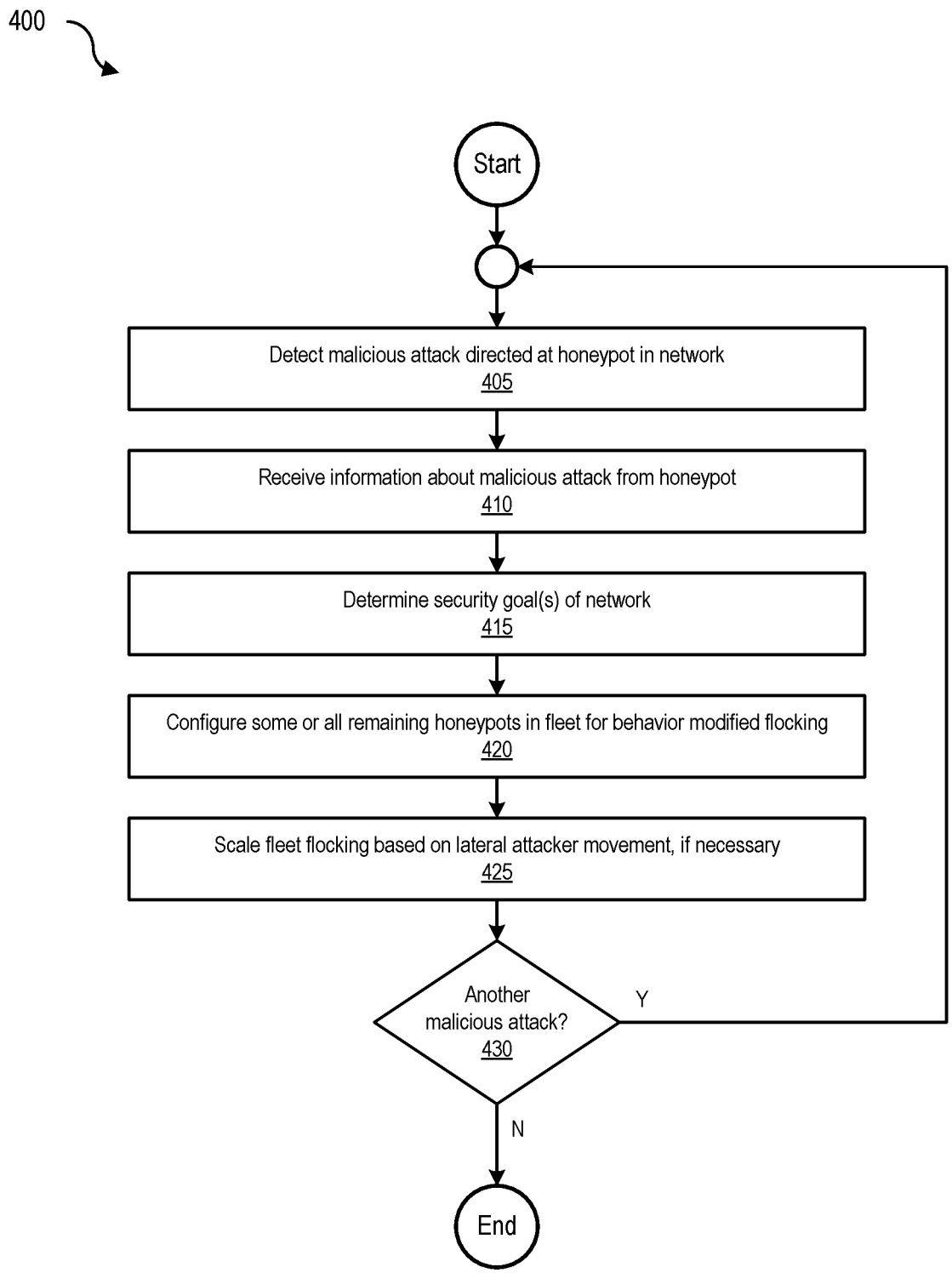
FIG. 4 is a flowchart 400 that illustrates a process for scaling fleet flocking based on lateral attacker movement, according to one embodiment of the present disclosure.

FIG. 4 is a flowchart 400 that illustrates a process for scaling fleet flocking based on lateral attacker movement, according to one embodiment. The process begins at 405 by detecting a malicious attack directed at a honeypot in a network (e.g., attack analysis engine 135 can detect malicious attack 205 from attacker 140(1) directed at honeypot 150(1), which is sacrificial honeypot 215 as shown in FIG. 2A). At 410, the process receives information about the malicious attack from the honeypot (e.g., attacker metadata 180).

At 415, the process determines the security goal(s) of the network (e.g., engagement, avoidance, or mixed), and at 420, the process configures some or all remaining honeypots in the honeypot fleet for behavior modified flocking (e.g., a scaled flocking operation). At 425, the process scales the fleet flocking based on lateral attacker movement, if necessary. At 430, the process determines if there is another malicious attack. If there is another malicious attack, the process loops top 405. Otherwise, the process ends.

Figure 5:
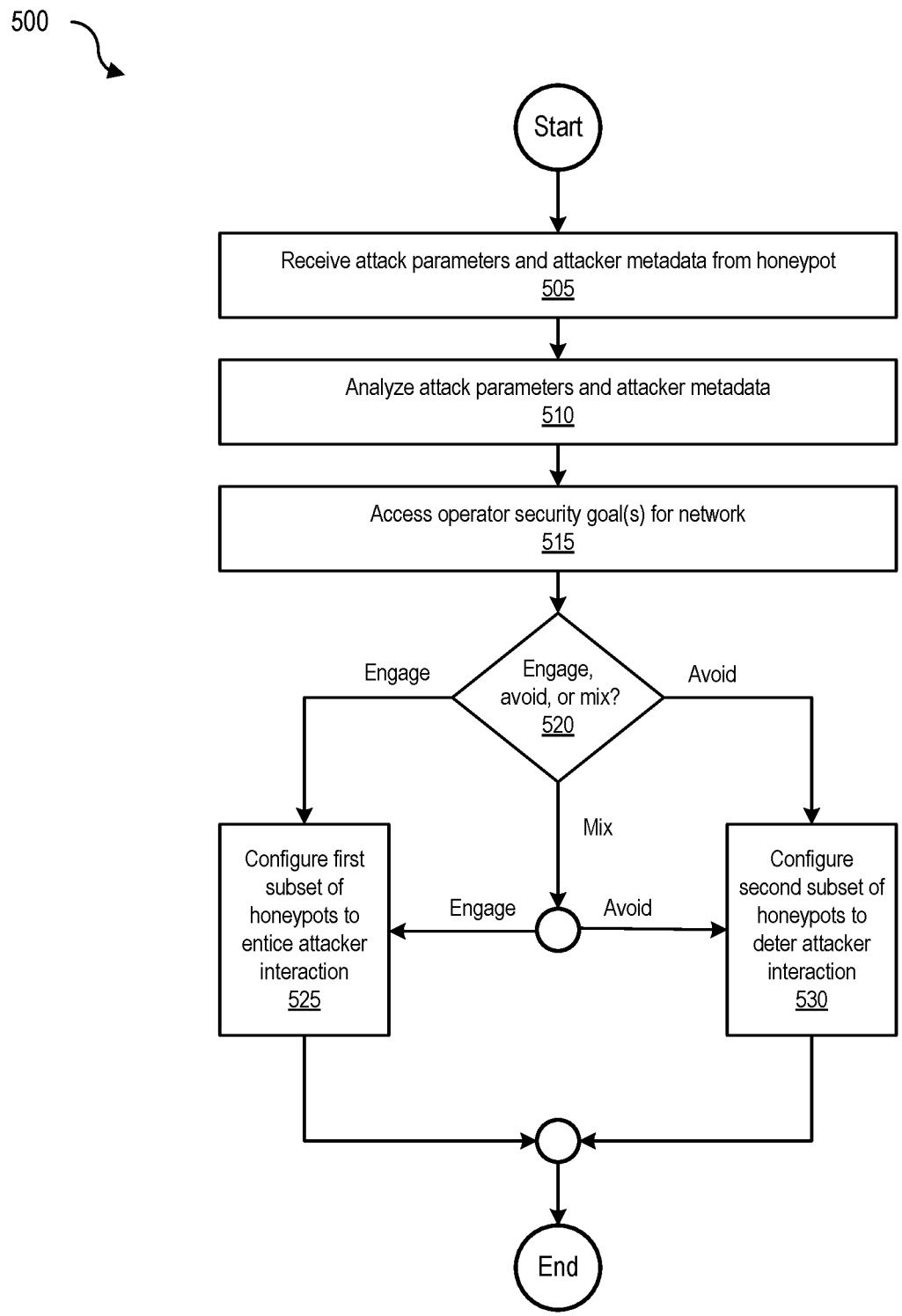
FIG. 5 is a flowchart 500 that illustrates a process for performing a dynamic fleet flocking operation, according to one embodiment of the present disclosure.

FIG. 5 is a flowchart 500 that illustrates a process for performing a dynamic fleet flocking operation, according to one embodiment. The process begins at 505 by receiving attack parameters and attacker metadata from a honeypot (e.g., attacker metadata 180 and attack parameters 210), and at 510, analyzes the attacker parameters and the attacker metadata. Attack parameters 210 contain information about one or more exploits that are being used by an attacker to target one or more vulnerabilities. Attack metadata on the other hand consists of attack parameters that are processed by a honeypot that is under attack to include that honeypot's unique personality characteristics that are subject to the ongoing malicious attack.

Such processing can supplement the attack parameters with particular features that the attacker is seeking and/or expecting in the honeypot. For example, attack parameters 210 can include exploits such as EternalBlue that targets Windows systems using a vulnerability in SMB, where as attacker metadata can include EternalBlue—the attack parameter, supplemented by other local information that is personal to the honeypot vis-à-vis the honeypot's interaction with the attacker during the particular attack—e.g., a particular network share, a particular storage device, a particular database, banner information, host name(s), and the like, that is exposed to the attacker and/or that is expected by the attacker.

At 515, the process accesses operator security goal(s) for the network (e.g., maintained by honeypot management system 110 of honeypot management server 105 as shown in FIG. 1A). Such goals can include attacker engagement, attack avoidance, a mixed fleet flocking strategy, a fleet scaling strategy, and the like, based on one or more criteria such as exploits used, vulnerabilities exploited, new or unknown vulnerabilities encountered, protected hosts tethered to honeypots and vice-versa, confidential information that can potentially be exposed if the attacker is enticed to engage, and the like.

At 520, the process determines whether to perform a scaled fleet flocking operation based on engagement, avoidance, or a mix of engagement and avoidance. If engagement is desired, required, and/or selected, the process ends at 525 by configuring a first subset of honeypots to entice attacker interaction and if avoidance is desired, required, and/or selected, the process ends at 530 by configuring a second subset of honeypots to deter attacker interaction. However, if a mix of engagement and avoidance is desired, required, and/or selected, the process ends at 525 and 530 by performing a mixed fleet flocking operation (engagement and avoidance).

Figure 6:
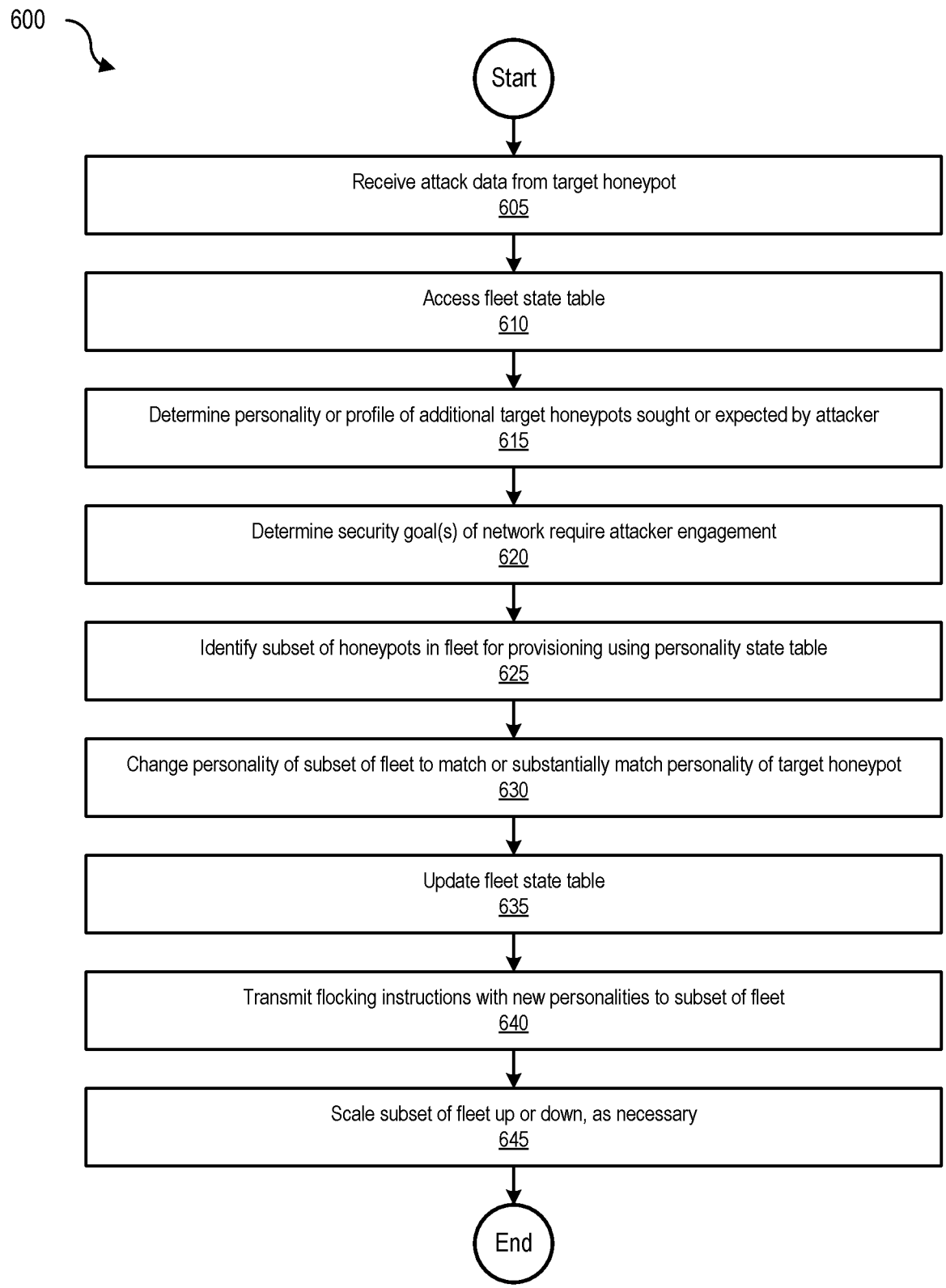
FIG. 6 is a flowchart 600 that illustrates a process for scaling a subset of a honeypot fleet up or down for attack engagement, according to one embodiment of the present disclosure.

FIG. 6 is a flowchart 600 that illustrates a process for scaling a subset of a honeypot fleet up or down for attacker engagement, according to one embodiment. The process begins at 605 by receiving attack data from a target honeypot (e.g., a sacrificial honeypot), and at 610, accesses a fleet state table (e.g., fleet state table 305 of FIG. 3). At 615, the process determines the personality or profile of additional target honeypots sought or expected by the attacker.

At 620, the process determines that the security goal(s) of the network require attacker engagement and at 625, identifies a subset of honeypots in the fleet for provisioning using a personality state table (PST). At 630, the process changes the personality of the subset of the fleet to match or substantially match the personality of the target honeypot (e.g., OS, banner, host name, service(s), and the like).

At 635, the process updates the fleet state table, and at 640, transmits flocking instructions (e.g., flocking instructions 230) with new personalities to the subset of the fleet. The process ends at 645 by scaling the subset of the fleet up or down, as necessary (e.g., based on how many honeypots in the fleet can be configured similarly in a timely manner to be made available to the lateral movement of the attacker, among other factors).

Figure 7:
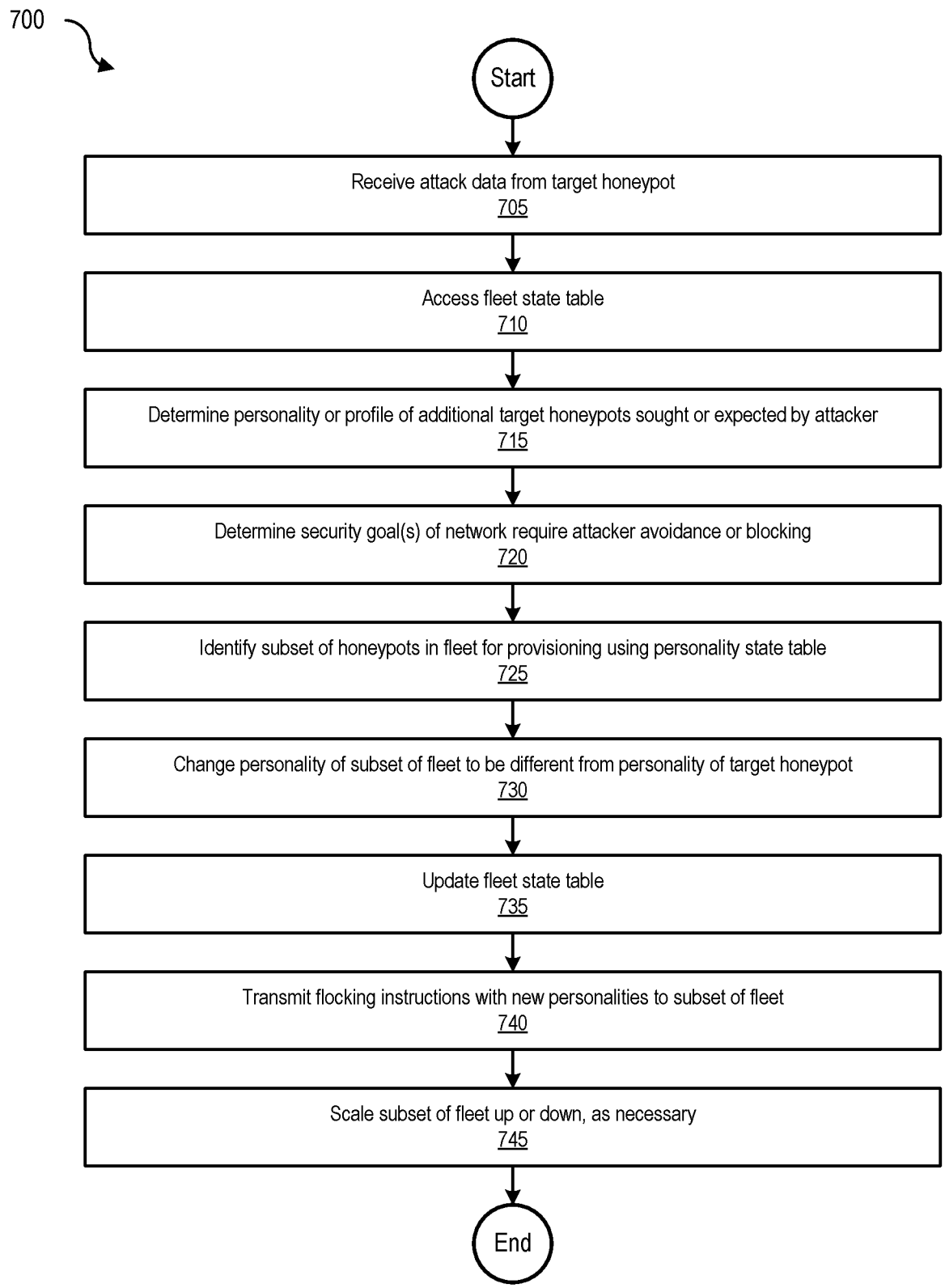
FIG. 7 is a flowchart 700 that illustrates a process for scaling a subset of a honeypot fleet up or down for attacker avoidance, according to one embodiment of the present disclosure.

FIG. 7 is a flowchart 700 that illustrates a process for scaling a subset of a honeypot fleet up or down for attacker avoidance, according to one embodiment. The process begins at 705 by receiving attack data from a target honeypot (e.g., a sacrificial honeypot), and at 710, accesses a fleet state table (e.g., fleet state table 305 of FIG. 3). At 715, the process determines the personality or profile of additional target honeypots sought or expected by the attacker.

At 720, the process determines that the security goal(s) of the network require attacker avoidance or blocking and at 725, identifies a subset of honeypots in the fleet for provisioning using a personality state table (PST). At 730, the process changes the personality of the subset of the fleet to be different from the personality of the target honeypot (e.g., OS, banner, host name, service(s), and the like).

At 735, the process updates the fleet state table, and at 740, transmits flocking instructions (e.g., flocking instructions 230) with new personalities to the subset of the fleet. The process ends at 745 by scaling the subset of the fleet up or down, as necessary (e.g., based on how many honeypots in the fleet can be configured differently in a timely manner to be made available to the lateral movement of the attacker, among other factors).

Example Computing Environment

Figure 8:
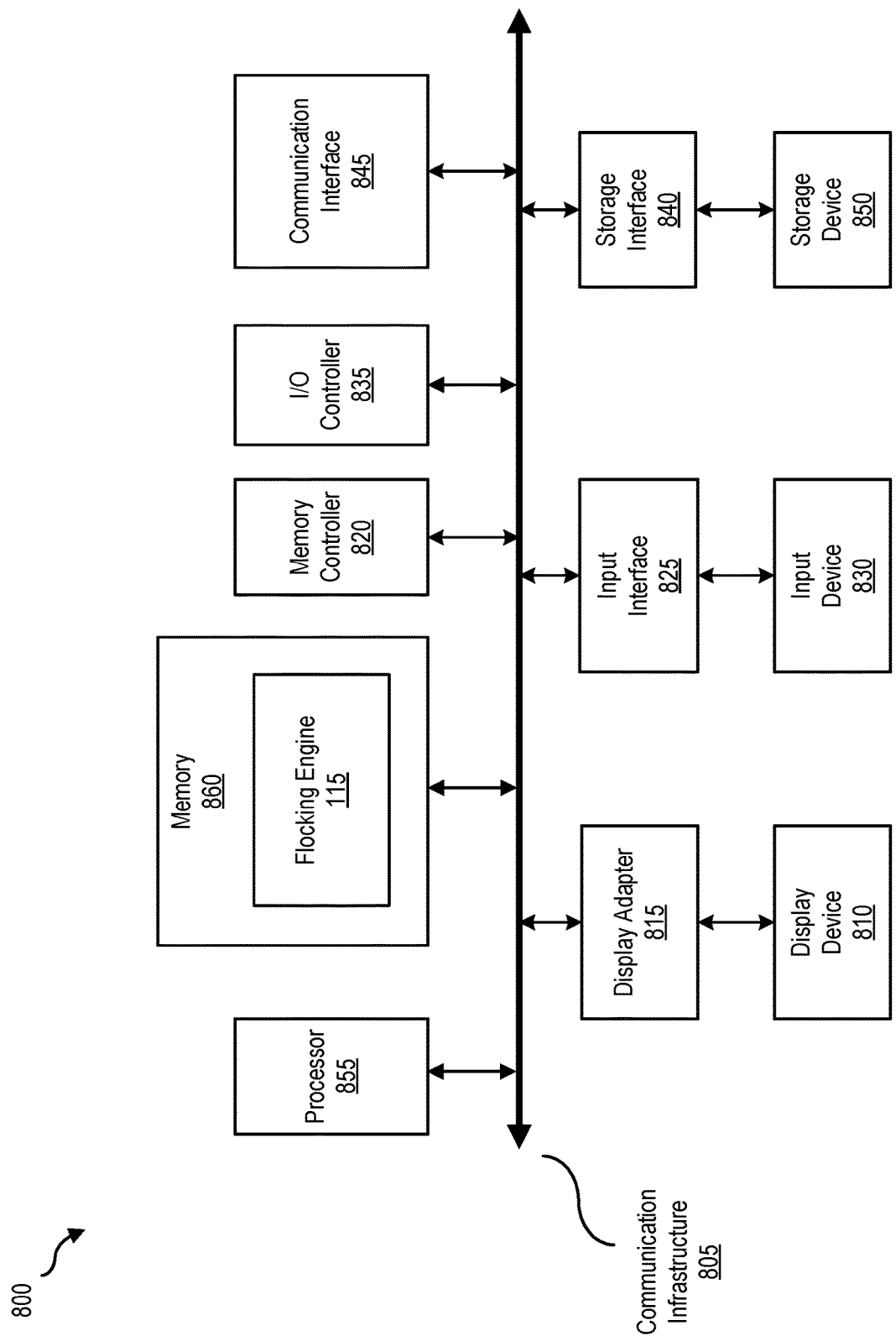
FIG. 8 is a block diagram 800 of a computing system, illustrating how a flocking engine can be implemented in software, according to one embodiment of the present disclosure.

FIG. 8 is a block diagram 800 of a computing system, illustrating how a flocking engine can be implemented in software, according to one embodiment. Computing system 800 can include honeypot management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes flocking engine 115, computing system 800 becomes a special purpose computing device that is configured to manage the behavior of deception system fleets.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing flocking engine 115 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
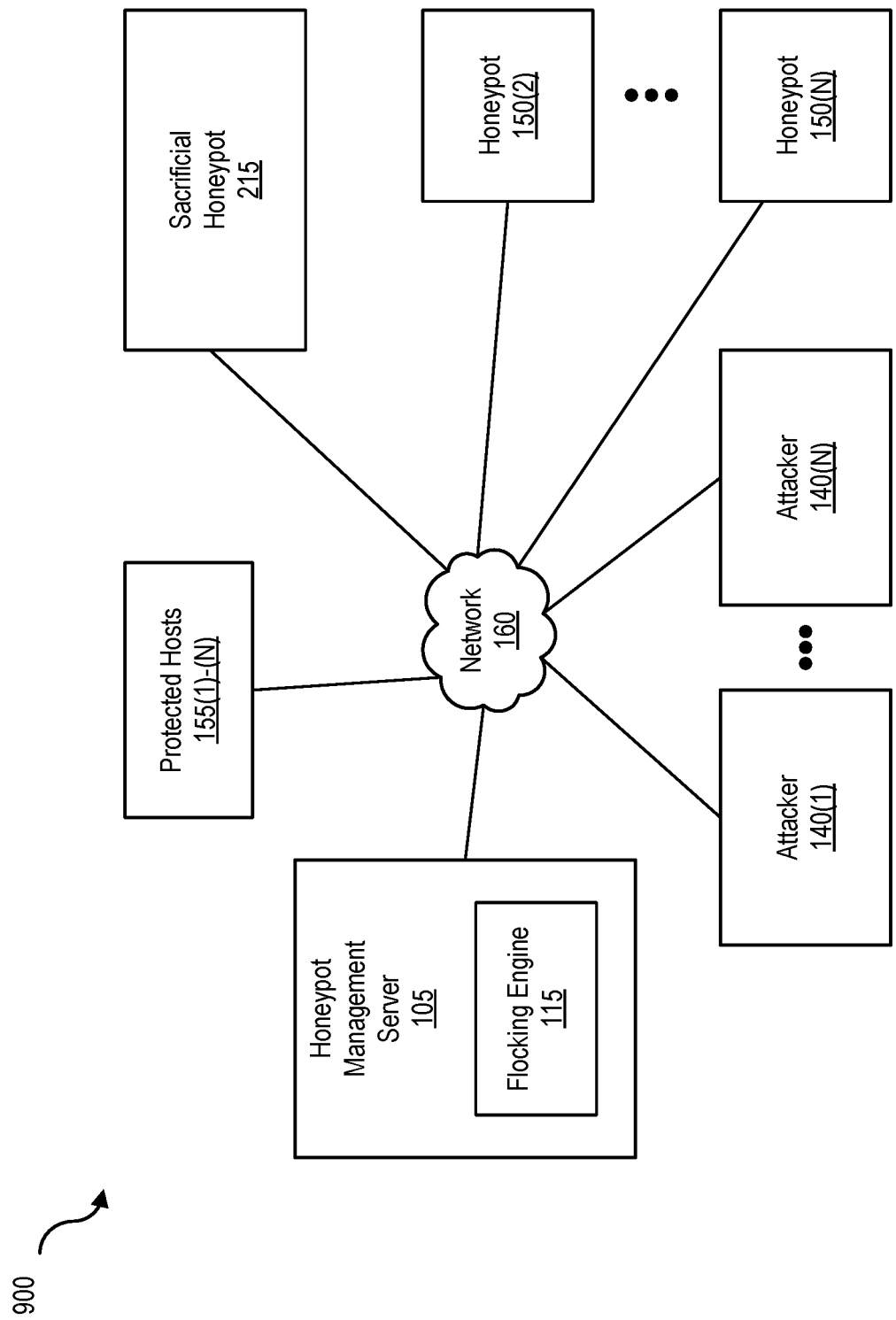
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 160 generally represents any type or form of computer network or architecture capable of facilitating communication between honeypot management server 105 and honeypot fleet 145, and can be a Wide Area Network (WAN) (e.g., the Internet) or a Local Area Network (LAN). In certain embodiments, a communication interface, such as communication interface 845 in FIG. 8, may be used to provide connectivity between honeypot management server 105 and honeypot fleet 145, and network 160. The embodiments described and/or illustrated herein are not limited to the Internet or any particular network-based environment.

In some embodiments, flocking engine 115 may be part of honeypot management server 105, or may be separate. In one embodiment, all or a portion of one or more of the disclosed embodiments may be encoded as a computer program and loaded onto and executed by honeypot management server 105 or by one or more honeypots in honeypot fleet 145, and may be stored on honeypot management server 105, and distributed over network 160. In some examples, all or a portion of honeypot management server 105 and/or honeypot fleet 145 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, flocking engine 115 may transform the behavior of honeypot management server 105 to manage the behavior of deception system fleets.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    detecting a malicious attack received by a honeypot, wherein
        the malicious attack is initiated by an attacker,
        the honeypot is one of a plurality of honeypots, and
        the plurality of honeypots are a part of a network;
    receiving information associated with the malicious attack from the honeypot; and
    based on the received information,
        configuring a first subset of honeypots of the plurality of honeypots other than the honeypot to entice the attacker to continue engagement with the first subset of honeypots, and
        configuring a second subset of honeypots of the plurality of honeypots other than the honeypot to deter the attacker from engaging with the second subset of honeypots.

2. The computer-implemented method of claim 1, further comprising:
    accessing a fleet state table; and
    based on the received information, modifying the fleet state table.

3. The computer-implemented method of claim 1, further comprising:
    performing a scaled flocking operation.

4. The computer-implemented method of claim 2, wherein
    configuring the first subset of honeypots comprises provisioning the first subset of honeypots to match the behavior of the honeypot.

5. The computer-implemented method of claim 1, further comprising:
    configuring the first subset of honeypots to be vulnerable to the malicious attack directed at the honeypot.

6. The computer-implemented method of claim 1, wherein
    configuring the second subset of honeypots comprises provisioning the second subset of honeypots to differ from the behavior of the honeypot.

7. The computer-implemented method of claim 1, further comprising:
    configuring the subset of honeypots based on a plurality of criteria comprising at least an attacker location, a vulnerability age, or an unknown vulnerability.

8. A non-transitory computer readable storage medium comprising program instructions executable to:
    detect a malicious attack received by a honeypot, wherein
        the malicious attack is initiated by an attacker,
        the honeypot is one of a plurality of honeypots, and
        the plurality of honeypots are a part of a network;
    receive information associated with the malicious attack from the honeypot; and
    based on the received information,
        configure a first subset of honeypots of the plurality of honeypots other than the honeypot to entice the attacker to continue engagement with the first subset of honeypots, and
        configure a second subset of honeypots of the plurality of honeypots other than the honeypot to deter the attacker from engaging with the second subset of honeypots.

9. The non-transitory computer readable storage medium of claim 8, wherein
    configuring the first subset of honeypots comprises provisioning the first subset of honeypots to match the behavior of the honeypot, and
    configuring the second subset of honeypots comprises provisioning the second subset of honeypots to differ from the behavior of the honeypot.

10. The non-transitory computer readable storage medium of claim 8, further comprising:
    accessing a fleet state table; and
    based on the received information, modifying the fleet state table.

11. The non-transitory computer readable storage medium of claim 8, further comprising:
    performing a scaled flocking operation.

12. The non-transitory computer readable storage medium of claim 9, further comprising:
    configuring the first subset of honeypots to be vulnerable to the malicious attack directed at the honeypot.

13. The non-transitory computer readable storage medium of claim 8, further comprising:

configuring the subset of honeypots based on a plurality of criteria comprising at least an attacker location, a vulnerability age, or an unknown vulnerability.

14. A system comprising:
one or more processors; and
a memory coupled to the one or more processors, wherein the memory stores program instructions executable by the one or more processors to:
detect a malicious attack received by a honeypot, wherein
the malicious attack is initiated by an attacker,
the honeypot is one of a plurality of honeypots, and
the plurality of honeypots are a part of a network;
receive information associated with the malicious attack from the honeypot; and
based on the received information,
configure a first subset of honeypots of the plurality of honeypots other than the honeypot to entice the attacker to continue engagement with the first subset of honeypots, and
configure a second subset of honeypots of the plurality of honeypots other than the honeypot to deter the attacker from engaging with the second subset of honeypots.

15. The system of claim 14, further comprising:
configuring the first subset of honeypots comprises provisioning the first subset of honeypots to match the behavior of the honeypot, and
configuring the second subset of honeypots comprises provisioning the second subset of honeypots to differ from the behavior of the honeypot.

16. The system of claim 14, further comprising:
accessing a fleet state table; and
based on the received information, modifying the fleet state table.

17. The system of claim 14, further comprising:
performing a scaled flocking operation.

18. The system of claim 15, further comprising:
configuring the first subset of honeypots to be vulnerable to the malicious attack directed at the honeypot.

19. The system of claim 14, further comprising:
configuring the subset of honeypots based on a plurality of criteria comprising at least an attacker location, a vulnerability age, or an unknown vulnerability.

* * * * *